Oct. 7, 1930.  J. RECKHARD  1,777,996

INCUBATOR

Filed June 21, 1928  2 Sheets-Sheet 1

Inventor:
Julius Reckhard.

Oct. 7, 1930.                J. RECKHARD                1,777,996
                               INCUBATOR
                      Filed June 21, 1928        2 Sheets-Sheet 2
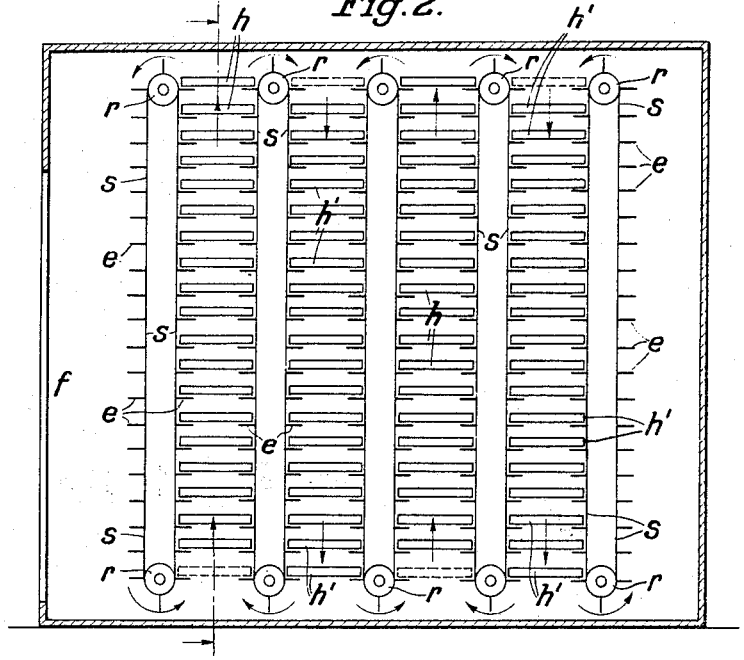
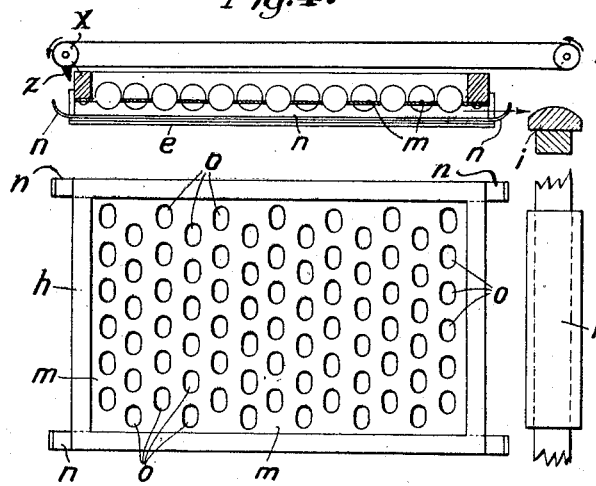
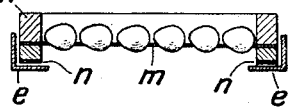
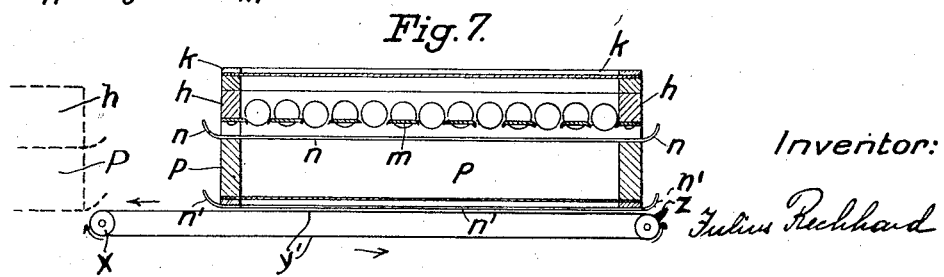
Inventor:
Julius Reckhard Patented Oct. 7, 1930

1,777,996

UNITED STATES PATENT OFFICE

JULIUS RECKHARD, OF RHYNERN, GERMANY

INCUBATOR

Application filed June 21, 1928, Serial No. 287,084, and in Germany June 27, 1927.

This invention has for its object to create an automatic incubator constructed so that the eggs to be hatched need be taken in the hand only once. The space in the apparatus is thoroughly utilized, the adjustable drop of temperature in the hatching space (about 40 to 30° C. from above downward) being designed to ensure the obtention of maximum efficiency.

The novelty consists in that the eggs lying on trays in the hatching space are continually or periodically moved upward, downward and in a horizontal plane on one or several conveyers so that at the downward movement they come into cooler air-layers and at the upward movement into hotter air-layers, and that at the movement in the horizontal plane they are rotated and brought to hatching.

An embodiment of the invention is illustrated, by way of example, in the accompanying drawing diagrammatically in seven figures, the devices for heating, ventilating and other details of secondary importance being omitted.

Fig. 1 is a longitudinal section.

Fig. 2 a side elevation.

Fig. 3 a top plan view showing a small hatching chamber according to the invention.

Fig. 4 shows in longitudinal section an egg turning arrangement.

Fig. 5 is a transverse section of the tray at right angles to Fig. 4.

Fig. 6 is a top plan view of Fig. 4, also showing the egg turning ledge, and

Fig. 7 shows in longitudinal section an egg tray with the hatching cover and hatching box in position.

Figure 1:
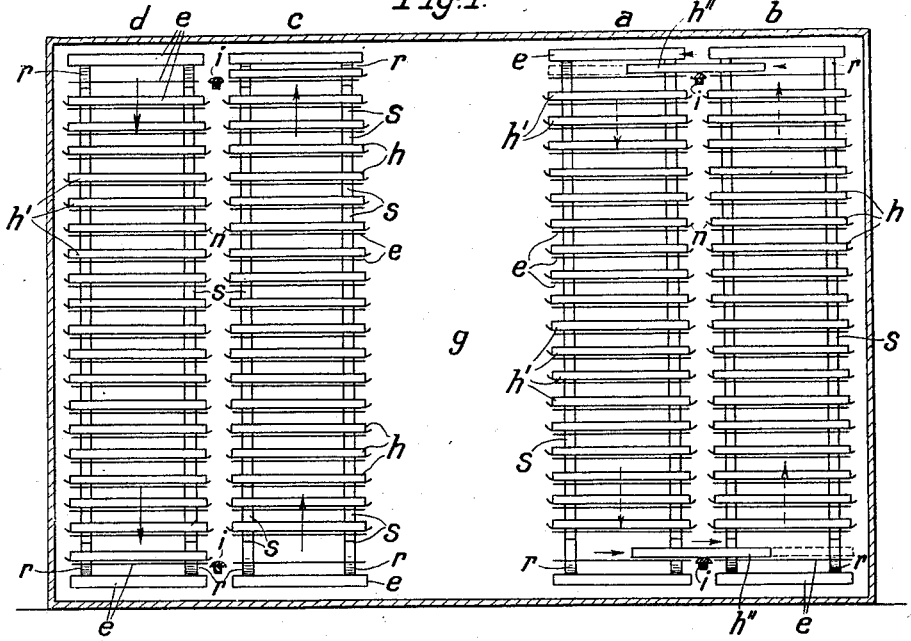
Figure 3:
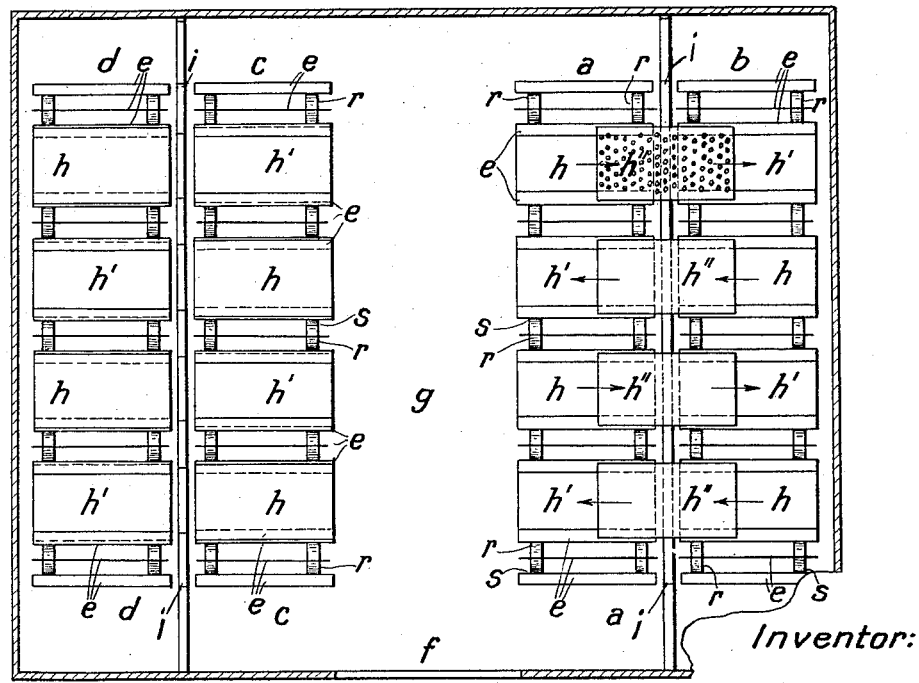

In a hatching chamber, accessible through a door $f$, four rows of conveying batteries $a$, $b$, $c$ and $d$ (Figs. 1 and 3) are arranged so that a passage $g$ is left at the middle, each row consisting of five conveying elements (Figs. 2 and 3) formed by wheels $r$ (drums or discs) and of the corresponding bands $s$ (chains, ropes or strips). The wheels $r$ rotatably mounted at certain distances apart are all of accurately the same size and their endless bands $s$ have carrying surfaces $e$ of such form that conveyers are formed, designed for moving upward and downward the egg-trays $h$, $h^1$. Each conveying element, consisting of two upper and two lower wheels $r$ connected by endless bands $s$, is intermittently driven in any suitable manner, not shown, so that the weight of the charges to be moved is equalized as well as possible. Every conveying element $r$, $s$ rotates in a direction opposite to the direction in which the adjacent elements rotate, and convenient mechanical or electric driving-feeding-or switching-arrangements are provided to stepwise convey over to the next following conveyer the egg-trays $h$, $h^1$ which are in the extreme upper or lower position on one conveyer. Figs. 1 and 3 show two moving conveying batteries $c$, $d$ and two stationary conveying batteries $a$, $b$. The upwardly moving egg-trays are designated by $h$ and the descending egg-trays by $h^1$. Narrow ledges $i$, adapted to be adjusted as regards height and covered with felt or cloth, serve for turning the eggs.

Figs. 4, 5 and 6 show a cross section and Fig. 6 a top-plan view, showing an egg-tray $h$ of manageable form, a turning ledge or bar $i$ being indicated. The bottom-plate $m$ of the tray has elliptic apertures $o$ (Fig. 6) of such dimensions that the eggs, lying in these apertures, project from the lower surface of the bottom-plate of the tray about one quarter of their height. On the lower surfaces of the longitudinal bars of the tray frame balls, rollers or, as shown, flat metal bands $n$ are arranged the projecting ends of said metal bands being upwardly curved in order to reduce to a minimum the friction on the supporting surfaces of the conveying elements $r$, $s$, when the trays are moving in the horizontal plane and further, in order to equalize slight differences of height between the carrying surfaces of adjacent conveyer elements $r$, $s$.

Fig. 7 shows the connection of an egg-tray $h$ with an upper cover $k$ and a lower hatching box $p$ of wire gauze which might also have balls, rollers or runner-like metal bands $n^1$.

The operation of the incubator described is comparatively simple. The egg-trays $h$ with the eggs for hatching are inserted in layers through the door $f$ into the hatching chamber and pushed from the passage $g$ into the ascending and descending conveyers, first by hand between the carrying surfaces $e$ of two adjacent carriage elements $r$, $s$, for example of the batteries $a$ and $c$, until these conveyers are filled. The time occupied in conveying each tray from top to bottom and vice versa in the incubator is preferably about one hour but this time may be regulated by differently setting the transmission gear. The conveying mechanisms acting in the top and bottom portions of each conveyer effect the horizontal movement of the uppermost and lowermost trays $h$ and $h^1$ automatically in the following manner: The ascending conveyers are intermittently stopped as soon as the tray $h$ arrives at the top end, the tray being then automatically and slowly pushed from the top end of the conveyer out of their initial position through the central position $h''$, indicated in full lines in Figs. 1 and 3 in the direction of the arrow-lines into the extreme position on the other conveyers indicated in dash-lines in Fig. 1. The pushing mechanism at the bottom-end of the descending conveyer acts at the same time on the lowermost tray $h'$ in opposite direction (Fig. 1) at the right side of the lower end. The uppermost and lowermost trays on two pairs of conveying elements are therefore pushed at the correct moment from the one conveyer onto the other conveyer, so to say in circulation. The conveyers of the batteries $c$ and $d$ are imagined as being in movement shortly before the stopping, the conveyers in the batteries $a$ and $b$ being stopped and the upper and lower shifting mechanisms of the same being in operation. The downwardly projecting portions of the eggs on the slowly shifted trays $h$, $h'$ pass over the adjustable upper and lower turning bars $i$ and are rotated accordingly.

All the eggs pass by the circulating movement consecutively through all air-layers in the hatching chamber in continual alternation from the hottest zones and inversely, and at every intermittent short stop at the top-end and at the bottom end they are turned by the bars $i$ up to the hatching.

For the candling, the egg-hurdles are removed from the conveyers and placed in the passage $g$ of the darkened hatching chamber or in a separate dark room on lighted boxes of corresponding dimensions to be then returned into the conveyers.

As soon as the first charge of eggs is ripe for hatching cover $k$ and hatching boxes $p$ are placed on the corresponding trays, as shown in Fig. 7, the trays and box connected by spring-clamps or other means. As the hatching trays composed in this manner are too high for the normal intervals between the supporting surfaces $e$ of the conveying bands $s$, they have to be inserted into other conveyers without turning bars $i$ and having sufficiently large intervals between the carrying surfaces.

The conveying of the upper egg-tray $h$ of a rising conveyor band to the uppermost empty carrying surface $e$ of a descending conveyor-band may be effected by a rope or chain $y$ running over wheels $x$, as shown in Fig. 4. This endless chain $y$ has a catch $z$ which engages the upper edge of the egg-tray and carries it to the other side. Fig. 7 shows the manner in which the feeding device transports the lowest trays. In this case the catch $z$ of the chain $y$ running over the sprocket wheels $x$ engages the lower edge of the tray and carries it slowly to the other side, to the position shown in dotted lines.

I claim:—

1. An incubator, comprising in combination a hatching chamber, a number of endless conveyers, means for intermittently moving said conveyers, trays having apertures in the bottom-plate, each aperture adapted to hold one egg said trays adapted to be mounted on said conveyers so that at the downward movement said trays pass through cooler air-layers and at the upward movement through hotter air-layers, means for shifting the uppermost tray from one conveyer-band to the adjacent conveyer-band and the lowermost tray from said other conveyer-band onto said first mentioned conveyer-band in the horizontal direction, and a device for turning the eggs in said shifted trays during the horizontal movement of said trays.

2. In the incubator specified in claim 1, the device for turning the eggs consisting of two turning bars one at the upper end and one at the lower end between every two adjacent conveyers, so that, when the uppermost and lowermost trays are being shifted, the eggs in the same are turned when passing over the corresponding turning bars.

3. An incubator as specified in claim 1, comprising in combination with the egg-trays a covering tray adapted to be placed on the egg-tray, a hatching box adapted to be placed under said egg-tray, and spring-clamps for connecting said covering-tray egg-tray and hatching box with one another to form a hatching tray.

In testimony whereof I affix my signature.

JULIUS RECKHARD.